United States Patent [19]
Bahlinger et al.

[11] 3,739,210
[45] June 12, 1973

[54] RECTIFIER BRIDGE

[75] Inventors: Walter Bahlinger; Herbert Vogt; Helmut Fischer, all of Munich, Germany

[73] Assignee: Siemens Aktiengesellschaft, Berlin and Munich, Germany

[22] Filed: July 31, 1972

[21] Appl. No.: 276,656

[30] Foreign Application Priority Data
Aug. 6, 1971 Germany.................. P 21 39 607.6

[52] U.S. Cl. .................................. 310/68 D, 321/8
[51] Int. Cl. ............................................. H02m 7/52
[58] Field of Search ................ 310/68 R, 68 D; 321/8

[56] References Cited
UNITED STATES PATENTS
3,160,771  12/1964  Martin et al. .................. 310/68 R
3,602,793  8/1971  Grozinger .......................... 310/68
3,611,107  10/1971  Ruckel ............................... 321/8
3,641,374  2/1972  Sato ............................... 310/68 D Primary Examiner—J. D. Miller
Assistant Examiner—H. Huberfeld
Attorney—Benjamin H. Sherman, Charles F. Meroni and J. Arthur Gross et al.

[57] ABSTRACT

Rectifier bridge in the form of two insulated bus bars extending in the same plane and at least four disk cells, which may be diodes, maintained in current conductive engagement with the bus bars by leaf springs. Each leaf spring is connected to a bus bar intermediate its ends and presses one disk cell into conductive engagement with a bus bar at one end and another disk cell in conductive engagement with another bus bar at its opposite end. The leaf springs are insulated from the bus bars and may be riveted thereto and the electrical connection may be directly through the rivets and the output terminals of a three-phase alternating current generator.

5 Claims, 2 Drawing Figures

Patented June 12, 1973 3,739,210

RECTIFIER BRIDGE

FIELD OF THE INVENTION

Compact form of rectifier bridge utilizing semiconductor rectifiers and adapted to be mounted on the bearing plate of an alternating current generator.

PRIOR ART, SUMMARY, ADVANTAGES AND OBJECTS OF INVENTION

A rectifier bridge in the form of two bus bars and disk cells or diodes pressed against the bus bars by springs, has previously been shown and described in the German Auslegeschrift 1,279,850. With the arrangement shown and described in this patent, the disk cells rest against the same alternating current clamps and are arranged one above the other between two superimposed direct-current bus bars. A spring is positioned between two of the disk cells and presses the disk cells against the bus bars.

This rectifier arrangement, while satisfactory, requires a relatively large amount of space and is not suitable for use in places where space is at a premium such as in the alternating current generators used in automotive vehicles or other apparatus, which of necessity, must be confined to locations having no surplus space.

In the present invention, the bus bars are in the form of plates arranged in the same plane in generally interdigitating relation with respect to each other. A plate-shaped insulator piece extends over the bus bars and insulates them from each other and has openings therein for disk cells. Leaf springs are connected to the insulator plate and bus bars and insulated therefrom and engage the disk cells at their ends pressing the disk cells into conducting engagement with the bus bars.

The bus bars preferably are generally U-shaped in form to extend about the bearing of an alternating current generator and are provided with projections and recesses in their sides accommodating the bus bars to be recessed relative to each other and opposite sides of the bus bars to lie in a single plane. The disk cells are then engaged with the projecting portions of the bus bars so as to be on one projection of one bus bar and another projection of another bus bar and the leaf springs may advantageously form the current feed lines for the disk cells.

An object of the invention is to provide a bridge type rectifier in which the bus bars are all in a single plane and arranged in such a form as to fit about the bearing of an alternating current generator.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF PREFERRED EMBODIMENT OF INVENTION

Figure 1:
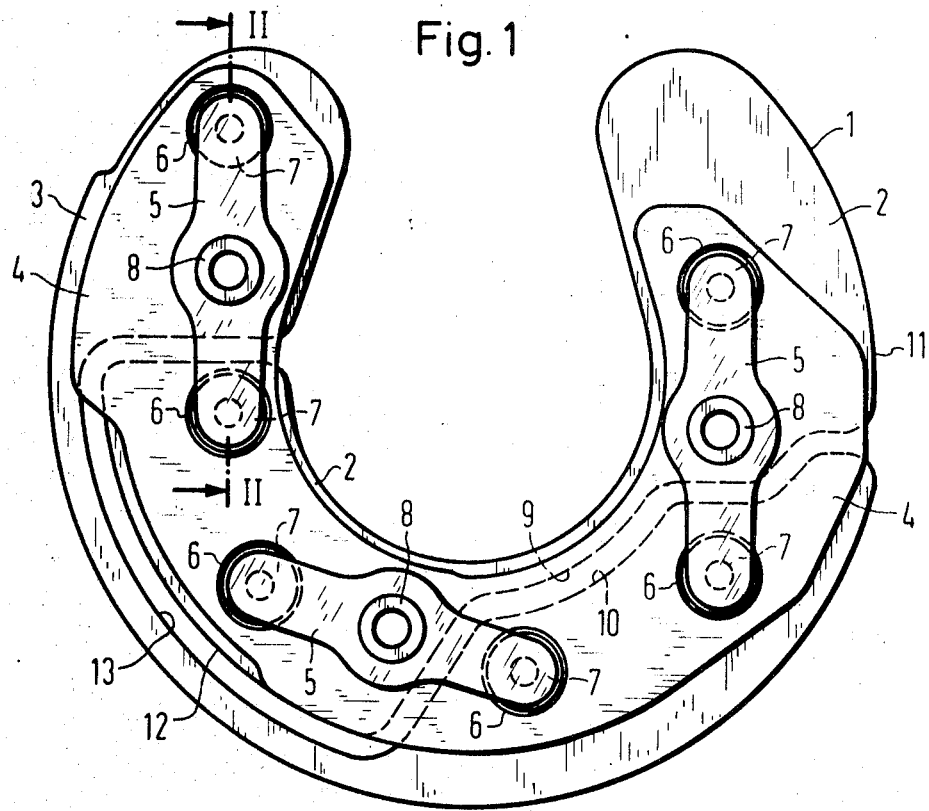
FIG. 1 is a front end view of a rectifier bridge constructed in accordance with the principles of the present invention.

In FIG. 1 of the drawings, we have shown a rectifier bridge 1 comprising two interdigitating generally U-shaped bus bars 2 and 3 mechanically connected with each other to have conducting surfaces all in the same plane, by means of a generally U-shaped flat or plate-like insulator piece 4, made from a suitable insulating material.

The insulator piece 4 has six openings 6 leading therethrough for a three-phase alternating current generator, with one disk cell 7 in each opening. Each disk cell may be in the form of or contain a rectifying diode and the six disk cells may contact the respective bus bars 2 and 3. The disk cell or diode types of rectifiers are of forms well known to those skilled in the art so need not herein be shown or described further. Leaf springs 5 extend along the insulator piece 4 over the openings 6 and engage the disk cells 7 at their opposite ends. One end of one leaf spring 5 will press a disk cell 7 into engagement with a bus bar 2 with the required contact pressure and the other end of the same leaf spring will press a disk cell 7 into engagement with a widened portion of a bus bar 3 with the required contact pressure. The other two leaf springs 5, will each press a disk cell into contact engagement with the widened portion of one bus bar at one end and a disk cell 7 into contact engagement with a widened portion of the other bus bar at its opposite end.

Figure 2:
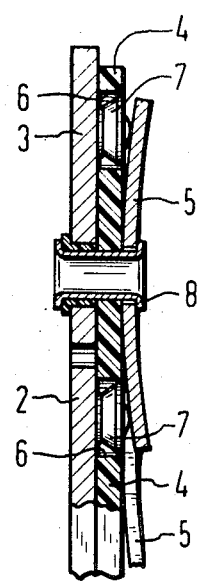
FIG. 2 is a sectional view taken through the rectifier bridge substantially along line II—II of FIG. 1.

The leaf springs 5 are shown in FIG. 2 as being riveted into engagement with the insulator piece 4 by hollow rivets 8 extending through the leaf springs 5, insulator piece 4 and associated bus bar, and insulated from the bus bars by an insulating bushing (FIG. 2). The hollow rivets 8 when securely riveting the leaf springs 5 to the insulator piece 4 thus tension the leaf springs 5 against the disk cell 7 and press the disk cells 7 into contacting engagement with the respective bus bars 2 and 3 (FIG. 2). The leaf springs 5 in addition to producing the necessary contact pressure between the disk cells 7 and the bus bars 2 and 3, also serve as supply lines for the current to the disk cells 7. The hollow rivets 8 may be directly connected with the terminals or clamps of a three-phase alternating current generator. The direct current output may thus be directly from the adjacent ends of the bus bars 2 and 3 through suitable terminals (not shown).

As previously mentioned, the bus bars 2 and 3 are generally U-shaped in form and are in the same plane. In order that the bus bars may take up a minimum amount of space and be mounted in interdigitating relation with respect to each other, the bus bar 2 is provided with widened opposite end portions 11 and 12 forming the legs of the U and a recessed portion 9 along the base of the U receiving a widened portion 10 of the bus bar 3. The widened portion 10 generally conforms to the recessed portion 9 and forms one leg of the U of the bus bar 3. The bus bar 3 is also provided with a recessed portion 13 extending along the base of the U with widened opposite end portions. The recessed portion 13 forms a recess for the widened portion 12 of the bus bar 2. The interdigitating connected bus bars are of a generally horse-shoe shape in plan view when connected together by the insulator piece 4 and the rivets 8, riveting the springs 5 to said insulator piece and bus bars to enable said bus bars to fit above the bearing plate of an alternating current generator.

The bus bars, insulating piece and springs may thus be relatively thin while the minimum width of the recessed portions of the bus bars need only be of sufficient cross section to carry the required current. The width of the widened portions of the bus bars contacted by the disk cells 7 need only be of sufficient cross section to provide adequate cooling of the disk cells 7.

In FIG. 2 of the drawings, looking at a cross section of the rectifier bridge along line II—II of FIG. 1 the same parts are provided with the same reference numerals as in FIG. 1 to illustrate the connecting arrangement of the leaf springs to the insulating piece and bus bars by the rivets 8 and to illustrate the insulator bushing, insulating the hollow rivet with respect to the bus bar, and showing how the leaf springs 5 press the disk cells 7 into current contacting engagement with the bus bars 2 and 3.

As previously mentioned, the rectifier bridge is particularly adapted to be assembled directly to the bearing bracket of a three-phase alternating current generator. This assembly both enables the rectifier bridge to be directly connected to the generator and adds very little to the length of the generator, and thereby renders the bridge rectifier particularly advantageously applied to automotive vehicles.

It should also be understood that a bridge rectifier for a two-phase alternating current generator may also be constructed in accordance with the principles of this invention. In this case, in place of the six disk cells required for a three-phase alternating current generator, only four disk cells are required for the two-phase alternating current generator.

We claim as our invention:

1. In a rectifier bridge suitable for alternating current generators for automotive vehicles,
   two bus bars having current conducting surfaces lying in the same plane,
   an insulator piece extending over said bus bars and connecting said bus bars together,
   said insulator piece having a series of openings therein,
   a rectifying disk cell in each opening,
   a leaf spring engaging each two disk cells and extending along said insulator piece,
   means insulated from said bus bars and securing said leaf springs to said insulator strip and bus bars intermediate their ends and loading said leaf springs to bias said disk cells into engagement with alternate bus bars and maintain the respective disk cells in contact with respective bus bars, and adapted to be connected with the output conductors of a three-phase alternating current generator.

2. The rectifier bridge of claim 1,
   wherein the bus bars are carried in interdigitating relation with respect to each other and have widened end portions and recessed intermediate portions into which opposite ends of said bus bars extend, and
   wherein the disk cells engage the widened end portions of alternate bus bars in a common plane.

3. The rectifier bridge of claim 2, wherein the outer disk cells are maintained in current conducting engagement with the outer widened portions of the bus bars by the respective leaf springs and the center disk cells are alternately engaged with an outer and an inner widened portion of the bus bars by the respective leaf springs.

4. The rectifier bridge of claim 3, wherein the bus bars and insulator piece are generally U-shaped in form and are designed to fit about the bearing of an alternating current generator.

5. The rectifier bridge of claim 2, in which the means connecting the leaf springs to the bus bars form a connecting means for the terminals of an alternating current generator and have current conducting connection with a respective leaf spring and form the alternating current feed lines feed lines for the disk cells.

* * * * *